United States Patent

Rudd

[15] 3,680,961
[45] Aug. 1, 1972

[54] MEASUREMENT OF PARTICLE SIZES

[72] Inventor: Michael J. Rudd, Westbury-on-Trym, England

[73] Assignee: British Aircraft Corporation Limited, London, England

[22] Filed: June 1, 1970

[21] Appl. No.: 42,038

Related U.S. Application Data

[63] Continuation-in-part of Ser. No. 764,465, Oct. 2, 1968, Pat. No. 3,548,655.

[52] U.S. Cl. .................................. 356/102, 356/106
[51] Int. Cl. ......................... G01n 15/02, G01b 9/02
[58] Field of Search ............................. 356/102, 103

[56] References Cited

UNITED STATES PATENTS 3,275,834   9/1966   Stevens ..................... 356/102
3,153,727  10/1964   Nathan ..................... 356/102 X

OTHER PUBLICATIONS

" Surface Topography of Non–Optical Surfaces by Projected Interference Frings;" Rowe et al.; Nature, Vol. 216, p 786– 87

*Primary Examiner*—Ronald L. Wibert
*Assistant Examiner*—Conrad Clark
*Attorney*—Kemon, Palmer & Estabrook

[57] ABSTRACT

The size of particles moving in a confined path is measured by moving the particles through an interference pattern of fringes produced by a pair of coherent light beams. The periodic fluctuations in the light intensity as the particles move across the fringes are recorded on a fixed photodetector and the particle size is derived from a measurement of the magnitude of the fluctuations.

6 Claims, 7 Drawing Figures

MEASUREMENT OF PARTICLE SIZES

This application is a continuation-in-part of copending application Ser. No. 764,465 filed on 2nd Oct. 1968, now U.S. Pat. No. 3,548,655.

Aerodynamic problems in the design of aircraft structures are often solved using wind tunnels, and pressure fatigue testing is often carried out in water tunnels. When using these tunnels it is frequently important to know the speed of the fluid flowing through the tunnel at preselected points, and a convenient method of measurement, which avoids inserting a probe into the flow, is to use a laser Doppler velocimeter.

These velocimeters measure the velocity of fluid by suspending particles in the fluid and detecting a Doppler change in frequency of light scattered by the particles as they move across the focal point of a lens illuminated by a coherent light source. The scattered light effectively comprises a moving light source and the frequency shift is therefore representative of the velocity of the particles. The change in frequency, of the order of one part in $10^{10}$, is detected by recombining a preselected portion of the scattered light with the original light and picking up the resultant beats on a photodetector. However, since the fluid is normally transparent, only a very small proportion of the light is scattered, and even then, to collect an appreciable amount of scattered light a large receiving lens must be used and a small scattering angle employed. This means that the angle at which the Doppler shift is measured is not precisely fixed and hence a Doppler spectrum with an appreciable spread is produced.

According to the present invention the velocity or the size of particles suspended in a moving fluid, or affixed to a moving surface, is measured by arranging a coherent light source to produce an interference pattern of fringes in the fluid, or on the surface, the fringes being spaced apart in the direction of movement of the particles such that the movement of each particle across the fringes produces a periodic fluctuation in the amount of light absorbed or reflected by the particle, and recording the said periodic fluctuations on a fixed photodetector. The constantly changing path length between the particle and the detector produces a Doppler variation in the frequency of the periodic fluctuations representative of the velocity of the particles and the magnitude of the said fluctuations is representative of the particle size. The photodetector and the light source are positioned on the same or opposite sides of the moving particles depending on whether changes in reflected or absorbed light respectively, are being recorded. The moving surface may be transparent, specularly reflective, or diffusely reflective.

In a preferred arrangement a laser beam is spread out to illuminate either a pair of slits in a mask, or a thick beam splitter, and the two resultant coherent light beams are focused by a lens to produce a set of sinusoidal fringes in the focal plane. the system is therefore self-aligning since both beams are focussed at the same point by a common lens. The two beams may be derived from separate laser sources if the two sources are electronically coupled. In one embodiment of the invention the fringes are formed in a wind or water tunnel, and the light passing through the fringes is collected on the other side of the tunnel. A particle suspended in the fluid will produce a sinusoidal variation in the total amount of light transmitted, the crests occurring as the particle passes through the dark fringes. The actual frequency of the sinusoidal variations will therefore depend on the fringe spacing and the velocity of the particle and is given by the formula $n = (v \sin \theta)/\lambda$ where $v$ = the velocity of the particle perpendicular to the slits $\theta$ = the angle between the beams and $\lambda$ = the wavelength of the light. The frequency detected will be modified by the Doppler effect and to determine the velocity of the particle it is therefore necessary to measure the shift in frequency of the signal.

The magnitude of the signal depends on the total amount of light which is scattered and absorbed by the particle, and therefore is dependent on the size of each particle. In the previous system only a preselected portion of the scattered light was used, and the present system has therefore a much greater signal to noise ratio, the use of all the scattered light more than offsetting the reduction of signal due to the interposition of the mask.

Two examples representing different embodiments of the invention are shown in the accompanying drawings, in which.

Figure 1:
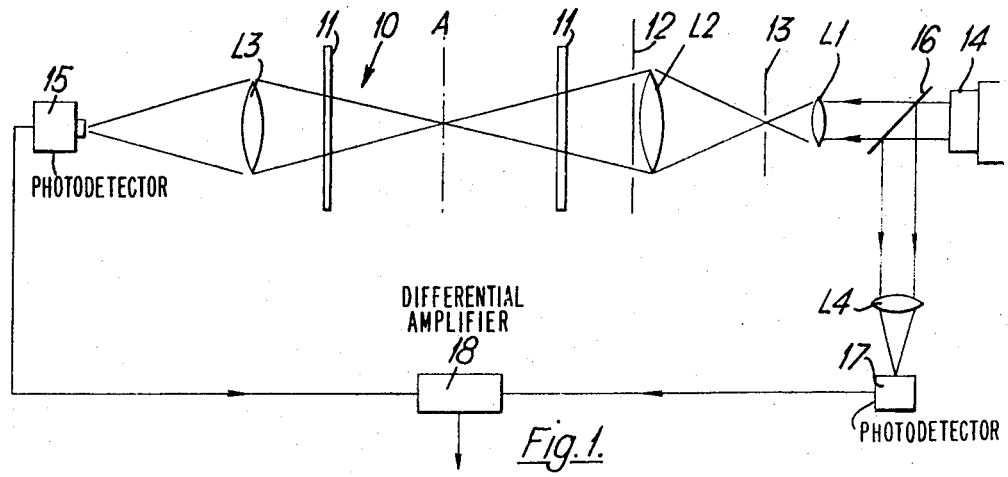
FIG. 1 illustrates the optical system employed in a laser Doppler velocimeter for the measurement of velocities or the sizes of particles suspended in a transparent liquid flowing along a tunnel.

Referring to FIG. 1, a wind or water tunnel 10 includes transparent wall portions 11. A fluid running through the tunnel is considered to be flowing in a direction perpendicular to the plane of the paper. Light from a laser source 14 passes through a beam splitter 16. A first beam from the beam splitter is converged by a microscope objective $L_1$, and a lens $L_2$ is spaced beyond the focal point of the lens $L_1$ such that it receives a beam of enlarged cross-sections. A mask 12, having two slits, is placed over the lens $L_2$ and the two beams from the slits pass through the transparent wall portions of the tunnel to focus in the plane A. A pin hole 13 is placed at the focal point of $L_1$ to define the incident beam more precisely.

A sinusoidal fringe pattern appears in the plane A, the fringes being spaced apart in a direction perpendicular to the plane of the paper. The fluid contains a suspension of particles and whenever one of the particles crosses the pattern of fringes it cuts off some of the light. The amount cut off will vary sinusoidally as the particle crosses the alternate dark and bright fringes, the actual amount depending on the brightness of the light and the size of the particle. Light transmitted through the tunnel is collected by the lens L3 and recorded on the photo-detector 15.

The second beam from the beam splitter 16 is converged by a microscope objective $L_4$ on to a second photodetector 17. The outputs from the two photodetectors 15 and 17 are fed to a differential amplifier 18. The purpose of the differential amplifier is to reduce, as far as possible, unwanted laser noise and beat frequencies between the various laser modes.

Figure 3:
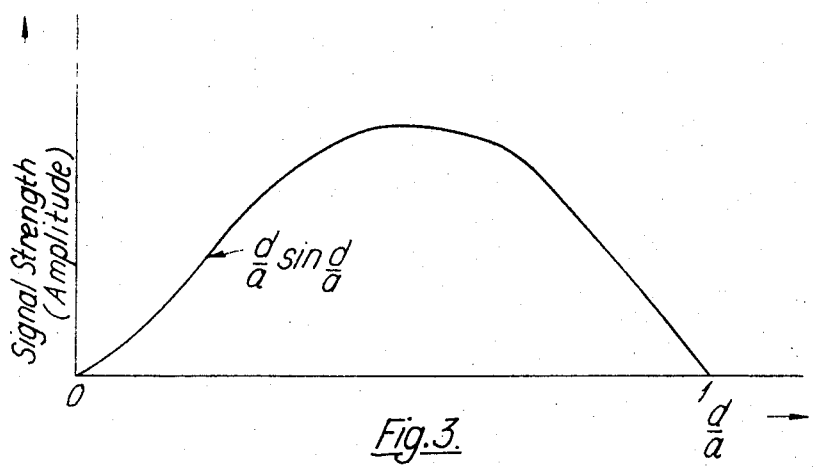
FIG. 3 is a curve illustrating the relationship between signal strength, particle size and fringe spacing.

The measurement of particle size is made as follows. For small particles, having a diameter $d$ smaller than the fringe spacing $a$, the amplitude of the signal at the photodetector will vary with the diameter of the particle as shown by the curve of FIG. 3. The curve rises to a maximum and then falls again to zero when the particle is equal in size to the fringe spacing $a$ (assuming a substantially square particle) since the particle then obscures an equal amount of the light and dark fringes and the proportion does not change as the particle moves across the fringes. The curve shown in FIG. 3 has the form $A = d/a \sin d/a$ where $A$ = amplitude of the signal at the photodetector.

The curve of FIG. 3 illustrates the effect of a single particle moving across the fringes. To take account of the large number of particles normally present at any one time, the number of particles is estimated from the signal-to-noise ratio of the output signal. If the detector has a time constant T and N particles pass through the beam in time T, then providing that the thermal and shot noise is small, the signal power-to-noise power ratio at the output of the photodetector is 1/N.

Once the number passing through in time T has been found, the number of particles per unit volume can be calculated knowing the velocity of the particles and the cross-section of the laser beam. Thus, although it is the total light obscured which is measured by the photodetector, the amount obscured by each particle can be determined. The velocimeter is preferably calibrated using particles of known size.

Figure 4:
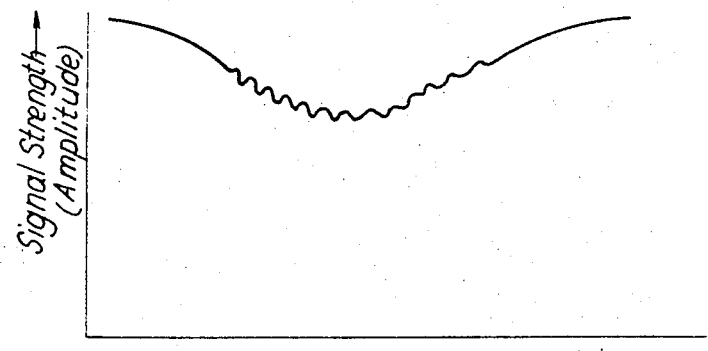
FIG. 4 illustrates the form of the signal obtained when a large particle moves across the fringes in the velocimeter of FIG. 1.
Figure 5:
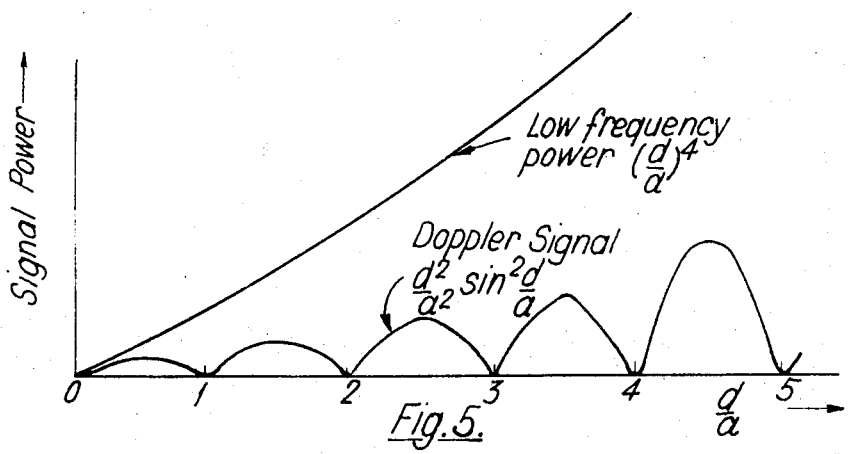
FIG. 5 shows two curves illustrating the relationship of signal power to particle size and fringe spacing for the two components of the signal shown in FIG. 4.
Figure 6:
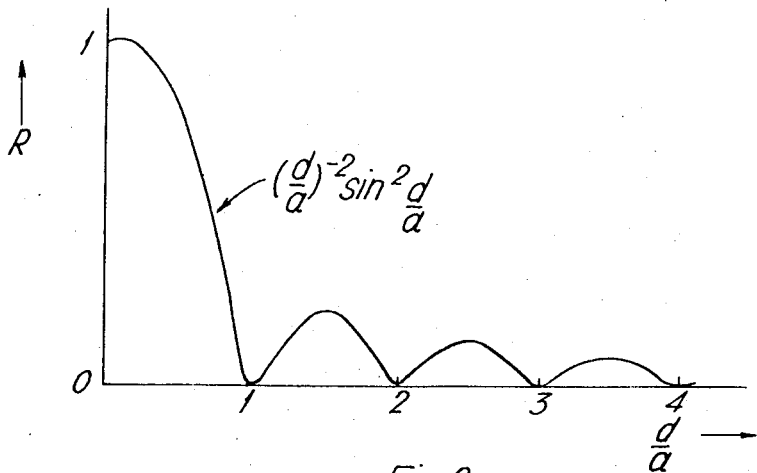
FIG. 6 illustrates the ratio of the two components shown in FIG. 5.
Figure 7:
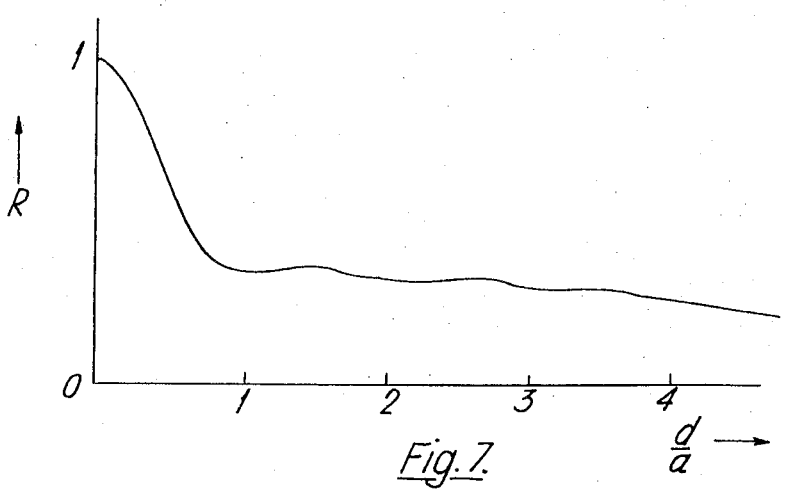
FIG. 7 shows the effect on the curve of FIG. 6 when a large number of particles are moving across the fringes of the velocimeter.

For larger particles, i.e., particles having a diameter greater than the fringe spacing, the signal can be split into two frequency components. The first component is a low frequency dip due to the particle obscuring some of the light, and is a measure of how long the particle is situated in the beam. The second component is a high frequency doppler signal, and the resultant signal therefore has the form shown in FIG. 4. The power of the low frequency output from the photodetector is proportional to the square of the particle area, or fourth power of particle size. The power of the Doppler signal, on the other hand, varies sinusoidally with particle size. The two resulting curves are shown in FIG. 5, (the two curves not being drawn to the same scale) and the result of plotting the ratio of the two curves is shown in FIG. 6. The effect of a spread in particle size on the curve of FIG. 6 is to smooth out the humps, and, in the limit, the curve has the form shown in FIG. 7 which approximately follows the equation $R = (d/a)^{-2}$ where R is the ratio of the powers of the two components. Thus, by measuring R the size of the particle is found in terms of the fringe spacing. As with smaller particles, the signal-to-noise ratio is measured to allow for several particles crossing the beam at the same time.

Figure 2:
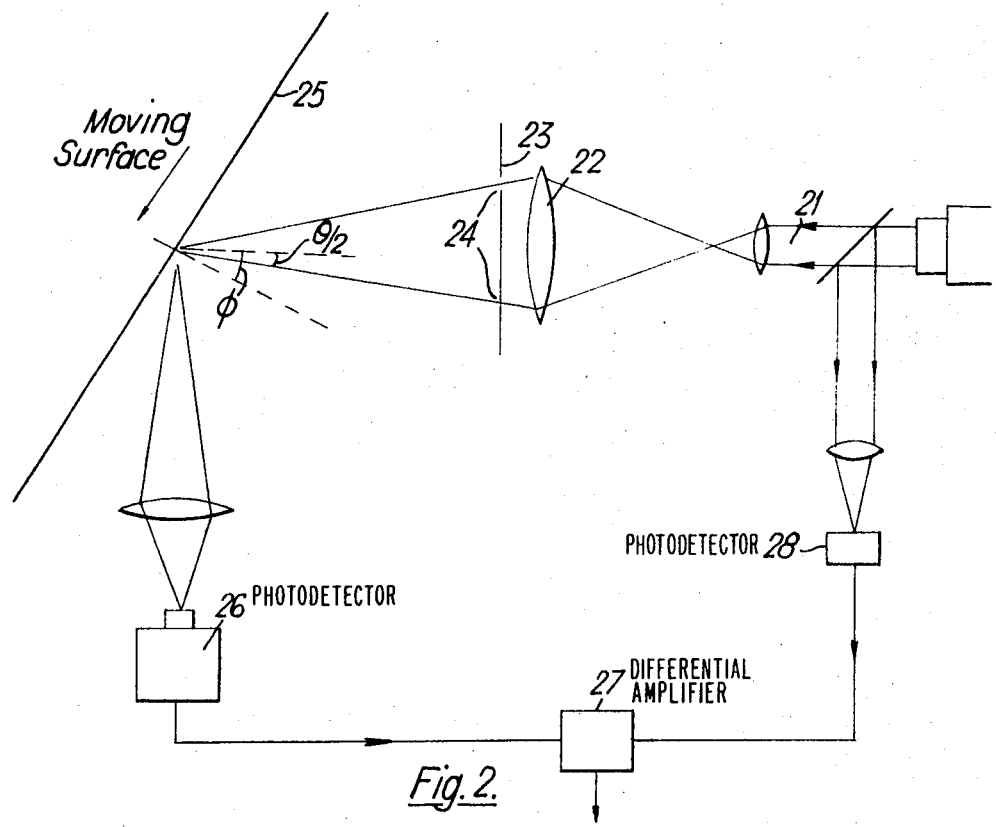
FIG. 2 illustrates the optical system employed in a laser Doppler velocimeter for measuring the velocities or the sizes of particles affixed to moving surfaces.

Referring to FIG. 2, a laser beam 21 is projected on to a lens 22 which is covered by a mask 23 having a pair of slits 24. The two coherent beams from the slits are focused on a specularly reflective moving surface 25 to produce an interference pattern. The surface may be coated with a number of light absorbent particles, although normally dust from the atmosphere which collects on the surface will be sufficient to achieve the desired effect. As any given particle moves across the fringes there will be a periodic change in the amount of light specularly reflected. As in the FIG. 1 arrangement, the output from the detector 26 is fed to a differential amplifier 27 where it is compared with an inverted output from a photodetector 28 receiving only laser noise and beat frequencies. The size of the particles on the surface, is then calculated in the same way as shown in the example of FIG. 1 by measuring the amplitude of the output signal from the differential amplifier 27.

In neither embodiment need the optical system be set up to an extremely high degree of accuracy since both beams travel through the same lens and are brought to the same focus. Any windows that are employed when viewing, such as the transparent portions of the wind or water tunnel, do not have to be high quality optical flats.

Although the examples described have been concerned with transmission through fluids and reflection from surfaces, it will be clear that the invention can apply equally well to transmission through transparent surfaces and reflection from particles suspended in a fluid.

I claim:

1. A method of measuring the size of particles moving in a confined path comprising: focusing a pair of coherent light beams to produce an interference pattern of fringes in the plane of movement of the particles, the fringes being spaced apart in the direction of movement of the particles such that the movement of each particle across the fringes produces a periodic fluctuation in the amount of light absorbed or reflected by the particle; recording the said periodic fluctuation on a fixed photodetector; and measuring the magnitude of the said fluctuations to derive the particle size.

2. A method as defined by claim 1 in which the particles are suspended in a moving fluid.

3. A method as defined by claim 1 in which the particles are affixed to a moving surface.

4. Apparatus for measuring the size of particles moving in a confined path comprising: a coherent light source; optical means arranged to focus a pair of coherent beams derived from the said source to produce an interference pattern of fringes in the plane of movement of the particles, the fringes being spaced apart in the direction of movement of the particles such that the movement of each particle across the fringes produces a periodic fluctuation in the amount of light absorbed or reflected by the particle; and a fixed photodetector positioned to receive the said periodic fluctuations whereby the magnitude of the said fluctuations is representative of the particle size.

5. Apparatus according to claim 4 in which the said optical means comprises a first converging lens positioned adjacent the laser source, a second converging lens so spaced from the first lens as to receive a beam of enlarged cross-section and a mask having a pair of slits placed over the second lens to provide the said two coherent beams.

6. Apparatus according to claim 4 further comprising a second photodetector positioned to receive light from the said light source, the light incident on the second photodetector not having crossed the said path and therefore having no periodic fluctuation, and a comparator for comparing the outputs from said two photodetectors to produce a resultant output substantially free of source noise or beat frequencies.

* * * * *